(No Model.) 2 Sheets—Sheet 1.

C. GERNERT.
LEMON SQUEEZER.

No. 261,844. Patented Aug. 1, 1882.

Witnesses
Thomas J. Bewley
G. Bolton Horton

Inventor
Charles Gernert
per Stephen Ustick att'y

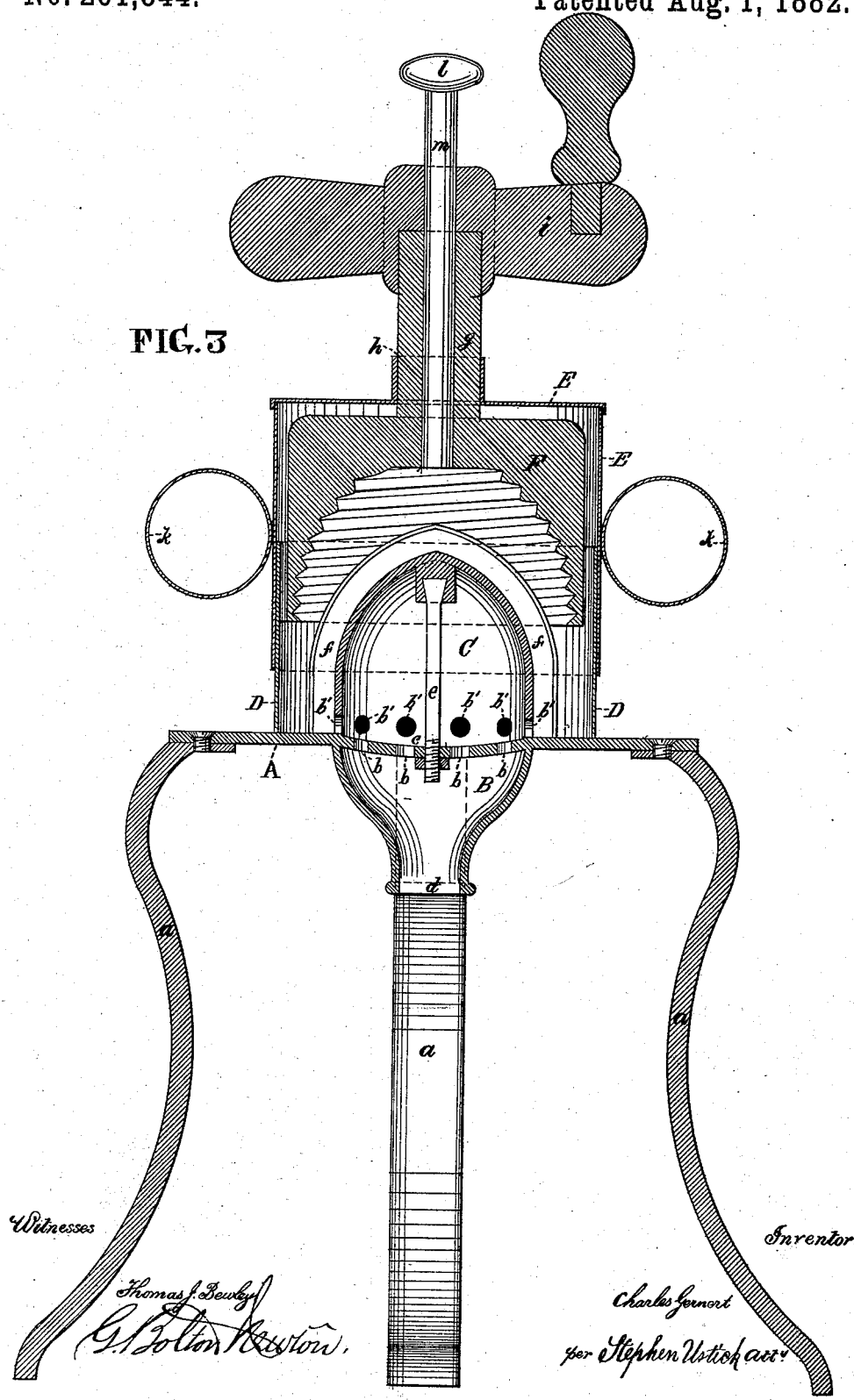

UNITED STATES PATENT OFFICE.

CHARLES GERNERT, OF PHILADELPHIA, PENNSYLVANIA, ASSIGNOR OF ONE-HALF TO FRANCIS PFAB, OF SAME PLACE.

LEMON-SQUEEZER.

SPECIFICATION forming part of Letters Patent No. 261,844, dated August 1, 1882.

Application filed June 8, 1882. (No model.)

*To all whom it may concern:*

Be it known that I, CHARLES GERNERT, a citizen of the United States, residing at Philadelphia, in the county of Philadelphia and State of Pennsylvania, have invented a new and useful Improvement in Lemon-Strainers, of which the following is a specification.

The ordinary mode of extracting the juice from the lemons is by direct pressure when separated into halves, which is a laborious process and extracts bitter juice with the juice from the pulp, thereby injuring its quality.

The object of my invention is the employment of such means as will avoid the extracting of the bitter juice, and the obtaining the pulp-juice with comparative little labor; and the nature of my invention consists of a cone having knife-edges on its surface, upon which the pulp side of the cut lemon is placed, in combination with a conical follower having a screw-thread surface, which is placed upon the surface of the skin, so as to take hold of the same, the first-described cone being made fast to a perforated bed-plate, provided at its lower side with a receiver for the extracted juice, and as the conical follower is turned around, holding fast to the skin, the latter is separated from the pulp and the juice extracted therefrom, as hereinafter fully described.

Figure 1:
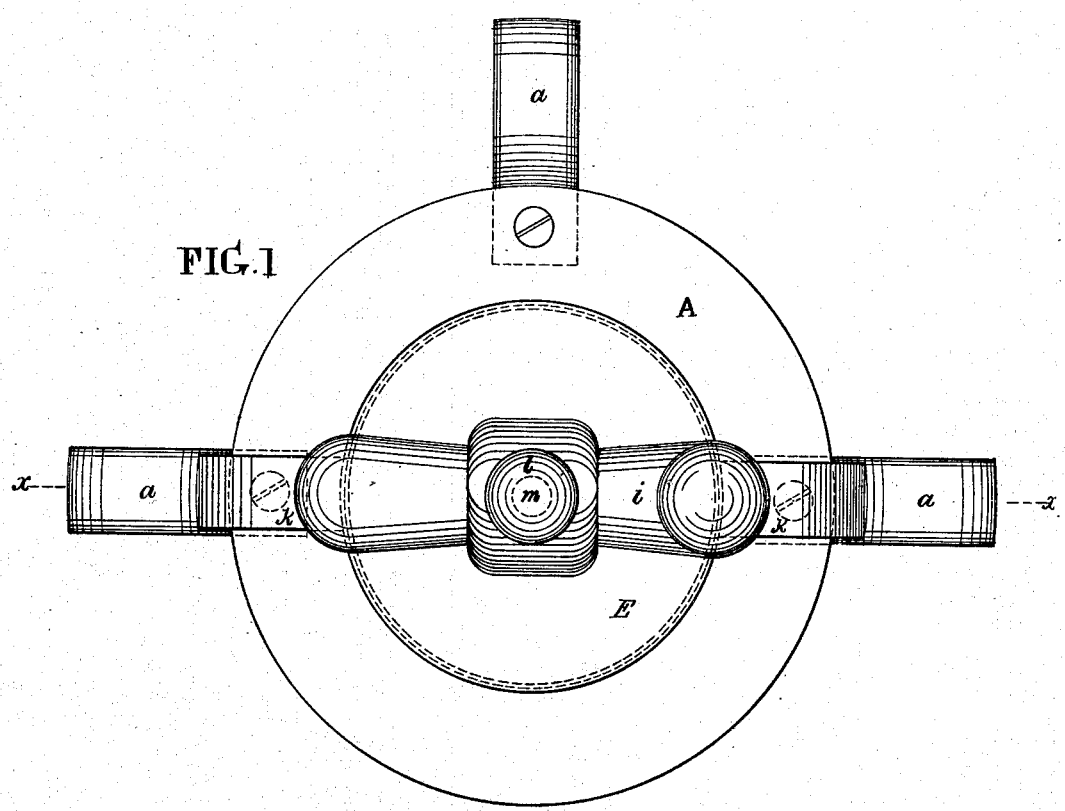
Figure 2:
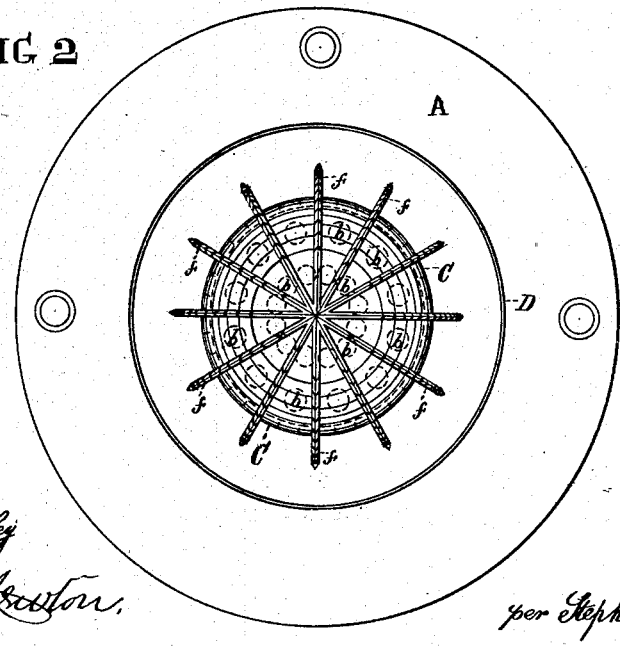

In the accompanying drawings, which make a part of this specification, Figure 1 is a plan view of my improved strainer. Fig. 2 is a top view of the bed-plate A and cone C. Fig. 3, Sheet No. 2, is a vertical section through the broken line *x x* of Fig. 1.

Like letters of reference in all the figures indicate the same parts.

A represents a bed-plate supported by legs *a*, and having a bowl, B, at its under side to receive the juice of the lemons as it passes through perforations *b* of the concavity *c* of the bed-plate, the bowl having a spout, *d*, through which the juice runs into a vessel placed beneath it.

C is a hollow cone, which is made fast to the bed-plate A by means of the connecting-screw *e*. The surface of the cone is provided with projecting knives *f*.

D is a rim which projects upward from the bed-plate A, and E is a detachable cap, which fits the same easily; and F, a conical follower, which has a stem, *g*, that has an easy fit in the central opening, *h*, of the cap, the stem *g* having a handle, *i*, for manipulating it.

The internal surface of the cone C has a screw-thread, whereby it takes a firm hold of the outer surface of the lemon-skin to prevent slipping as it is turned around.

The operation is as follows: The lemons being cut in halves, each piece, as it is placed upon the knife-edge cone, with the pulp upon the knife-edges, is subjected to the action of the conical follower F, which is turned around and slightly pressed down upon the skin, the screw-thread biting it sufficiently to prevent slipping, and the knife-edges of the permanent cone sinking into the pulp, whereby as the follower is turned around and pressed downward the skin is separated from the pulp and the juice caused to run down over the conical surface and pass through perforations *b'* in the side of the cone and run into the concavity *c* of the bed-plate A, and through its perforations *b* into the bowl B, and thence through its spout *d* into a receiving-vessel. When the juice is extracted the operator takes hold of the handles *k k* of the cap E and detaches it from the rim D, with the follower F in connection, and presses upon the knob *l* on the upper end of the central rod, *m*, and discharges the lemon-skin, which completes the work of extracting the juice of one piece of lemon preparatory for another operation.

Very little labor is required to extract the juice by the above process, and hence the work can be done very expeditiously.

The lemons being incased, as above described, there is no possibility of the juice spurting onto the person operating the device, as in the working of ordinary implements for extracting the same.

I claim as my invention—

1. The cone C, having knives *f* projecting from its surface, in combination with the bed-plate A and follower F, having a screw-threaded surface, the cone having perforations $b'$ at its base, and the bed-plate a concavity, $c$, provided with perforations $b$, substantially in the manner and for the purpose set forth.

2. The conical follower F, having a screw-threaded surface, and a stem, $g$, provided with a handle, in combination with the cone C, having knives $f$, and the detachable cap E, substantially as and for the purpose set forth.

CHARLES GERNERT.

Witnesses:
THOMAS J. BEWLEY,
STEPHEN USTICK.